Aug. 31, 1954     N. A. TORNBLOM     2,687,904
FITTING FOR FLEXIBLE CONDUITS
Filed Dec. 6, 1950
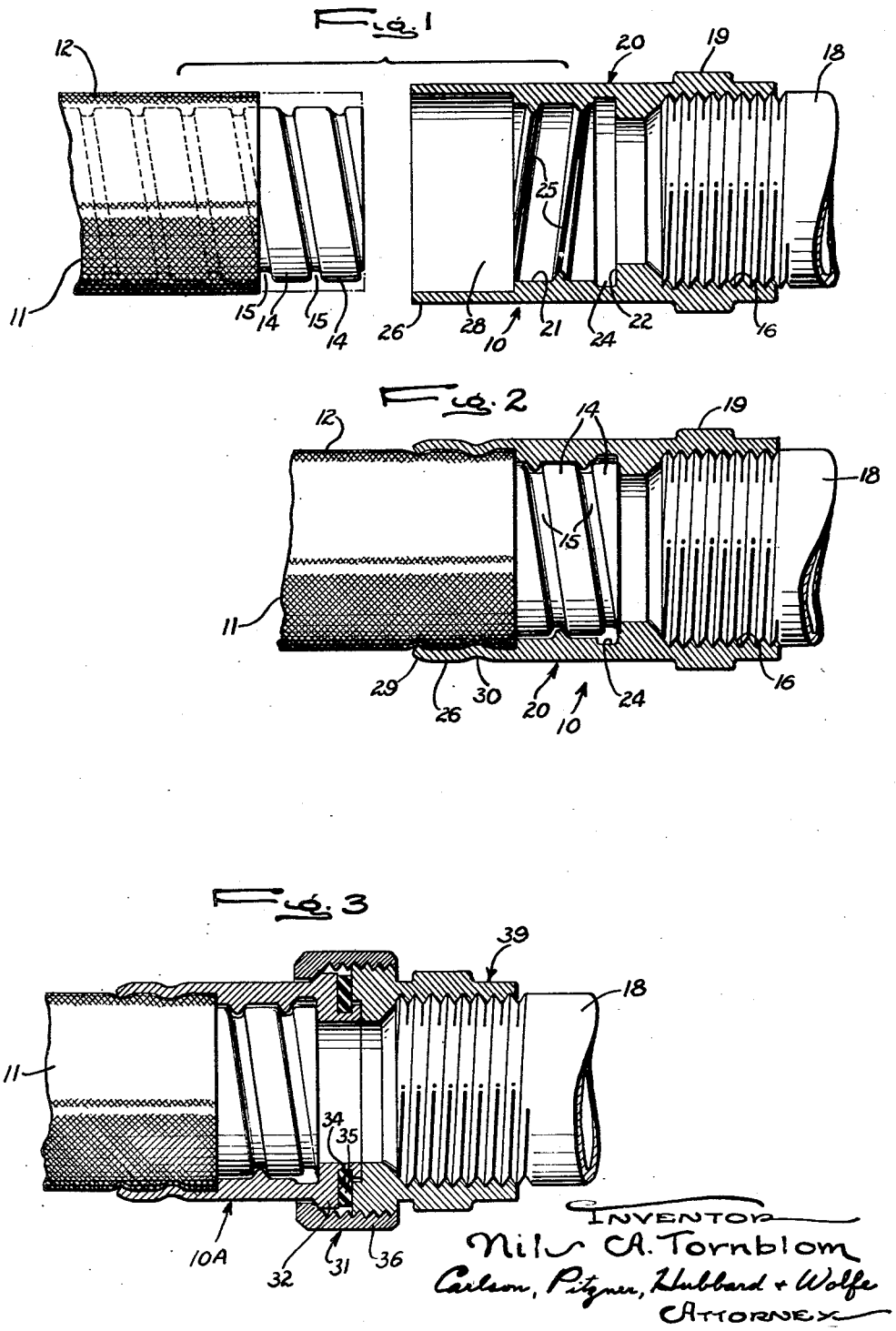

Patented Aug. 31, 1954

2,687,904

UNITED STATES PATENT OFFICE 2,687,904

FITTING FOR FLEXIBLE CONDUITS

Nils A. Tornblom, Chicago, Ill., assignor to Appleton Electric Company, Chicago, Ill., a corporation of Illinois Application December 6, 1950, Serial No. 199,460

1 Claim. (Cl. 285—72)

The present invention relates in general to fittings for electrical or fluid conduit. More particularly, the invention is concerned with a novel sealed fitting for attachment to the end of a spirally wound, flexible conduit surrounded by a protective sheath of resilient material such as synthetic rubber.

The principal object of the invention is to provide a fitting susceptible of attachment in fluid-tight relation with the end of a spirally wound flexible conduit having a resilient protective sheath, such fitting being adapted to utilize to the fullest extent the structure of the conduit and sheath.

Another object is to provide a fitting of the class set forth and which may be attached to the conduit on the job or in the shop with equal facility.

A further object is to provide a fitting of the foregoing type of simple, rugged construction and which lends itself readily to manufacture on an economical, mass productive basis as by the use of an automatic screw machine.

Other objects and advantages will become apparent as the following description proceeds, taken in connection with the accompanying drawing, wherein:

Figure 1 is a longitudinal sectional view taken through an illustrative fitting embodying the present invention and showing the end portion of a flexible conduit to which the fitting may be attached.

Fig. 2 is a view similar to Fig. 1 but shows the end of the conduit housed within the fitting and sealingly retained in place therein.

Fig. 3 is a longitudinal sectional view similar to Fig. 2 but shows a modified form of fitting also embodying the present invention, such fitting being in the form of a union.

While the invention is susceptible of various modifications and alternative constructions, certain preferred embodiments have been shown in the drawing and will be described below in considerable detail. It should be understood, however, that there is no intention to limit the invention to the specific forms disclosed, but on the contrary, the intention is to cover all modifications and alternative constructions falling within the spirit and scope of the invention as expressed in the appended claim.

Referring more specifically to the drawing, there is shown in Fig. 1 an illustrative fitting 10 embodying the present invention. The fitting 10 is adapted for attachment in sealed relation to the end of a flexible conduit 11 having a protective sheath 12 of resilient material such as synthetic rubber. The conduit 11 may house electric wiring or conduct fluid, being defined by a metallic strip in the form of spiral convolutions 14 separated by spiral grooves 15. The end of the fitting 10 remote from the conduit 11 is provided with means such as threads 16 for securing the fitting 10 to a support or another fitting such as threaded nipple 18. To facilitate attachment of the fitting 10 to the nipple 18, the former may be provided with flats 19 or other appropriate tool-engaging projections.

Provision is made for receiving within the fitting 10 the end portion of the conduit 11, taking full advantage of the structural features of the conduit for securing the same in place and for effecting a fluid-tight seal therewith. In furtherance of such objective, the fitting 10 is fashioned with a hollow body or sleeve 20 having an axial bore 21 therein terminating at its inner end in a conduit stop shoulder 22. In the present instance, the shoulder 22 is separated from the bore 21 by means of an annular recess 24. The bore 21 is of appropriate diameter to receive comfortably the exposed end portion of the conduit 11, from which portion the sheath 12 has been removed. To retain the end portion of the conduit, the bore 21 is provided with threads 25 which engage the grooves 15 in the conduit, the threads 25 having about the same pitch as the conduit grooves. By reason of this structure, the fitting 10 may readily be threaded onto the conduit until the exposed end of the conduit abuts solidly against the conduit stop shoulder 22. With the conduit in this position, withdrawal of the same from the fitting body 20 in response to purely axial force is strenuously resisted.

For the purpose of effecting a fluid-tight seal between the conduit 11 and the fitting 10, the body 20 is formed with a generally cylindrical skirt 26 at the end adjacent the conduit. The skirt 26 includes a counterbore 28 which terminates at the threaded bore 21, the counterbore being of appropriate diameter to telescopically receive the end portion of sheath 12. The end portion of the sheath 12 is, of course, spaced axially from the end portion of the conduit due to stripping away of the sheath from the latter. With the conduit inserted and threaded into the fitting 10 in the position indicated in Fig. 2, the seal may then be completed by forcing the skirt 26 tightly against the resilient sheath 12 as by means of radial pressure. While this may be accomplished in a variety of ways, it is done in the present instance by means of a rolling operation which reduces the diameter of the skirt in one or more axially spaced regions 29, 30 (Fig. 2). Due to the resiliency of the sheath 12, as well as the uniformity and extent of radial deformation of the skirt 26, a most effective fluid-tight seal is provided without the need for cement or additional sealing members. In addition, such construction introduces sufficient mechanical gripping force into the fitting to provide a high degree of resistance to torque tending to unscrew the conduit from the fitting. It also supplements the resistance set up by the threads 25 against axial pull-out forces on the conduit 11.

Turning now to Fig. 3, it will be perceived that there is shown a modified fitting 10A generally similar to the fitting 10 but in this instance comprising one member of a union or coupling 31. Since the internal parts of the fitting 10A which engage the conduit 11 are substantially identical with those of the fitting 10, further description of such parts at this point appears to be unnecessary. It might be noted in passing that the end of the fitting 10A remote from the conduit has an external annular rib 32 thereon which terminates in a sealing face 34 and a recess housing a resilient sealing washer 35. A clamping nut 36 engages the rib 32 and forces the fitting 10A against sealing face 38 of a mating fitting 39 with the washer 35 sandwiched therebetween. The fitting 39 happens in this case to be mounted on the threaded nipple 18.

It will be apparent to those skilled in the art that the invention possesses a number of important commercial advantages in addition to those already dealt with above. First of all, the invention is susceptible of embodiment in a wide variety of fittings, including male fittings, female fittings, and various types of couplings and unions. Being fluid-tight and possessing great mechanical strength against pull-out of the conduit when installed, fittings embodying the invention lend themselves to a field of use as comprehensive as that of coated flexible conduit. For example, these fittings are particularly well adapted for use with sections of conduit which protectively house electrical wiring leading from the base of a machine tool to a power driven tool head. On the other hand, such fittings may be used with conduit which conducts fluid rather than containing wiring.

Due to the fact that the novel fittings disclosed above are capable of sealing effectively without a critical fit at the end of the conduit, and without the need for cement or other supplemental parts, such fittings can be installed on the job or in the shop with equal facility. In addition, their simple, integral construction adapts them readily for mass-productive manufacture on an economical basis as by means of automatic screw machines.

I claim as my invention:

A fitting for use with a flexible conduit having alternate spiral convolutions and grooves together with a protective sheath of resilient material, said fitting comprising the combination of a hollow body having an axial bore therein for receiving an exposed end of the conduit with the sheath stripped therefrom, a conduit stop at the inner end of said bore, threads within said bore for engaging the grooves in the spirally wound conduit, a deformable skirt integral with said body and situated adjacent the end thereof remote from said conduit stop, said skirt being adapted to surround the end of said sheath and grip the same in fluid-tight relation therewith, an external annular rib at the end of said body remote from said skirt, an annular sealing face at the end of said rib, a resilient sealing washer abutting said sealing face, a mating fitting adapted to connect said body to another conduit, and a coupling nut adapted to hold said mating fitting against said resilient washer and in sealed relation with said body.

References Cited in the file of this patent

UNITED STATES PATENTS

| Number | Name | Date |
|---|---|---|
| 743,400 | Sherman | Nov. 3, 1903 |
| 1,315,784 | Levitt | Sept. 9, 1919 |
| 1,819,243 | Hubbark | Aug. 18, 1931 |
| 2,485,975 | Main | Oct. 25, 1949 |

FOREIGN PATENTS

| Number | Country | Date |
|---|---|---|
| 225,220 | Germany | Sept. 29, 1908 |
| 368,000 | Great Britain | Mar. 3, 1932 |
| 46,046 | Denmark | July 30, 1932 |